(12) United States Patent
Jorgensen et al.

(10) Patent No.: US 9,260,345 B2
(45) Date of Patent: Feb. 16, 2016

(54) METHOD FOR MANUFACTURING AN AEROGEL-CONTAINING COMPOSITE AND COMPOSITE PRODUCED BY THAT METHOD

(75) Inventors: Kristian Skovgard Jorgensen, Roskilde (DK); Ulrich Bauer, Sulzbach (DE); Gorm Rosenberg, Gadstrup (DK); Kenn Christensen, Havdrup (DK)

(73) Assignee: Rockwool International A/S (DK)

( * ) Notice: Subject to any disclaimer, the term of this patent is extended or adjusted under 35 U.S.C. 154(b) by 649 days.

(21) Appl. No.: 13/387,845

(22) PCT Filed: Jul. 30, 2010

(86) PCT No.: PCT/EP2010/061149
§ 371 (c)(1),
(2), (4) Date: Apr. 11, 2012

(87) PCT Pub. No.: WO2011/012710
PCT Pub. Date: Feb. 3, 2011

(65) Prior Publication Data
US 2012/0187323 A1    Jul. 26, 2012

(30) Foreign Application Priority Data
Jul. 31, 2009  (EP) .................................... 09167033

(51) Int. Cl.
*B29C 59/00* (2006.01)
*C04B 26/12* (2006.01)
*C04B 26/02* (2006.01)
*C04B 28/26* (2006.01)
*C04B 30/02* (2006.01)
*D04H 1/4209* (2012.01)
*D04H 1/732* (2012.01)

(52) U.S. Cl.
CPC ................. *C04B 26/12* (2013.01); *C04B 26/02* (2013.01); *C04B 28/26* (2013.01); *C04B 30/02* (2013.01); *D04H 1/4209* (2013.01); *D04H 1/732* (2013.01)

(58) Field of Classification Search
USPC ......................................... 264/121–126, 128
See application file for complete search history.

(56) References Cited

U.S. PATENT DOCUMENTS

2003/0077438 A1  4/2003  Frank et al.
2006/0163763 A1  7/2006  Fellinger

FOREIGN PATENT DOCUMENTS

| DE | 739 079 C | 9/1943 |
| DE | 810 132 C | 8/1951 |
| DE | 1 231 607 B | 12/1966 |
| DE | 1 671 186 A1 | 9/1971 |
| DE | 33 46 180 A1 | 8/1985 |
| WO | WO-97-10187 A1 | 3/1997 |

*Primary Examiner* — Stella Yi
(74) *Attorney, Agent, or Firm* — Tarolli, Sundheim, Covell & Tummino LLP

(57) ABSTRACT

The invention relates to a method for manufacturing an insulating composite containing mineral fibers, aerogel and binder. This method implies the step of suspending the fiber webs and aerosol in an air flow thereby disentangling the fiber webs and mixing fibers, aerosol and eventually binder homogeneously. The apparatus described combines spinning of the fibers, collecting them as webs, disentangling the fiber webs in suspended air, mixing the fibers with aerogel and cement as well as pressing and curing the mixture to a consolidated product of density 150 to 800 kg/m³.

19 Claims, 8 Drawing Sheets

METHOD FOR MANUFACTURING AN AEROGEL-CONTAINING COMPOSITE AND COMPOSITE PRODUCED BY THAT METHOD

FIELD OF THE INVENTION

The invention relates to a method for manufacturing an aerogel-containing composite and the novel aerogel-containing composite produced by that method. The invention also relates to apparatus suitable for carrying out the method of the invention.

BACKGROUND OF THE INVENTION

It has previously been attempted to provide an aerogel-containing composite for use as an insulating material. For example WO 97/10187 A1 relates to a composite aerogel material and a method for manufacturing an aerogel containing composite comprising the steps of providing fibers in an amount of from 0.1 to 40%-vol., providing an aerogel particulate material having an average particle diameter smaller than 0.5 mm in an amount of from 5 to 97%-vol., providing a resin binder, mixing the ingredients, and consolidating the ingredients by subjecting the material to hot pressing. This prior art document relates primarily to aerogel composites for electronic purposes taking advantage of low conductivity and low dielectric constant of aerogel. For this particular application thin layers are needed, such as 0.01 to 2 mm, which means that the size of the aerogel particles will influence the mechanical properties of the composite, so the focus of this prior art is to use aerogel particulate material having a very small diameter. No information is provided in the specification regarding the method used to mix the various components of the composite and how this affects the properties of the finished product. In particular, the skilled man is unable to achieve a homogeneous composite based on the information disclosed.

Another example can be found in US 2003/0077438 A1, which also relates to a composite aerogel material and a method for providing a composite aerogel material comprising the steps of providing fibers in an amount of from 0.1 to 40%-vol., providing an aerogel particulate material having an average particle diameter of at least 0.5 mm in an amount of from 5 to 97%-vol., providing a resin binder, mixing the ingredients, and consolidating the ingredients by subjecting the material to hot pressing. The resulting composite is alleged to possess good thermal insulation and good insulation against airborne sound. However, this document provides no information regarding the method used to mix the components of the composite and how this affects the properties of the composite. It does not teach the skilled person how to achieve a high level of homogeneity in the composite.

One of the main problems of previous aerogel containing composites and methods for manufacturing thereof is lack of cohesion and mechanical strength of the composites.

SUMMARY OF THE INVENTION

It is therefore an object of the present invention to provide an aerogel-containing composite having high mechanical strength and a method for manufacturing the composite.

According to the invention this object is achieved with a method for manufacturing an aerogel-containing composite, said method comprising the steps of:

providing mineral fibers in an amount of from 24 to 80 wt % of the total weight of starting materials, providing an aerogel particulate material in an amount of from 10 to 75 wt % of the total weight of starting materials, providing a binder in an amount of from 1 to 30 wt % of the total weight of starting materials, suspending the fibers in a primary air flow and suspending the aerogel particulate material in the primary air flow, thereby mixing the suspended aerogel particulate material with the suspended fibers, mixing the binder with the mineral fibers and/or aerogel particulate material before, during or after mixing of the fibers with the aerogel particulate material, collecting the mixture of mineral fibers, aerogel particulate material and binder and pressing and curing the mixture to provide a consolidated composite with a density of from 120 $kg/m^3$ to 800 $kg/m^3$, such as from 150 $kg/m^3$ to 800 $kg/m^3$.

This method can be used to produce a novel aerogel-containing composite.

One particular novel composite comprises:

fibers in an amount of from 24 to 80 wt % of the total weight of starting materials, aerogel particulate material in an amount of from 10 to 75 wt % of the total weight of starting materials, binder in an amount of from 1 to 30 wt % of the total weight of starting materials, wherein the composite is substantially homogeneous and is cured and pressed to a density between 120 $kg/m^3$ and 800 $kg/m^3$, such as between 150 $kg/m^3$ and 800 $kg/m^3$.

The percentages mentioned are based on dry weight of starting materials.

With the method according to the invention as defined above a very versatile and cost efficient method for manufacturing an aerogel containing composite is achieved. A wide range of properties in terms of e.g. mechanical strength, thermal insulation capability etc can be produced by altering the quantity of each component. This means that with the same method a variety of different composites can be made that are tailor-made for specific purposes.

Furthermore, it has been found that mixing the fibers and the aerogel particulate material as a suspension in an air flow provides a surprisingly homogeneous composite, especially considering the considerable differences in the aerodynamic properties of these materials. This high level of homogeneity in the composite results generally in an increased level of mechanical strength relative to the composites of the prior art for a given combination of quantities of the components. The increased homogeneity of the product also has other advantages such as aesthetic appeal and consistency of properties throughout a single product.

We believe that as a result of mixing the aerogel particulate material with the mineral fibers when suspended in an air flow, as in the present invention, the aerogel particulate material is allowed to penetrate into the tufts of fibers that are present. In contrast, when the mixing process involves physical contact of, for example, a stirrer with the fibers, the fibers tend to form compact balls, which the aerogel particulate material cannot penetrate easily. The result of this can be that, in cases where the mixing process involves physical contact, the final product contains areas where the aerogel and the fibers are visibly separated in distinct zones.

It has also been found that the composites of the present invention as a result of their homogeneity can be machinable in a similar way to wood. By "machinable", it should be understood that the composite can be machined in ordinary wood forming machinery, such as saws and shaping machines, e.g., grooving machines, surface milling cutters etc. The products produced by the method of the invention have a variety of uses, predominantly as building elements. In particular, the products can be in the form of panels. In general, the products are used in applications where mechanical stability and an even surface finish as well as insulating properties are important. In some applications, the panels can be used as acoustically absorbing ceiling or wall panels. In other applications, the panels can be used as insulating outer cladding for buildings.

Preferably, the composite is in the form of a panel. Preferably, the thickness of the panel is from 4 to 25 mm. In some embodiments, especially where the panel is used as cladding on a building, the thickness of the panel is preferably from 4 to 12 mm, more preferably from 5 to 10 mm and most preferably from 6 to 8 mm. In alternative embodiments, especially where the panel is used as an insulation panel for a wall of a ceiling, the thickness of the panel is preferably from 12 to 25 mm, more preferably from 15 to 23 mm and most preferably from 18 to 21 mm.

"Aerogel" when used in the broader sense, means a gel with air as the dispersion medium. Within that broad description, however, exist three types of aerogel, which are classified according to the conditions under which they have been dried.

These materials are known to have excellent insulating properties owing to their very high surface areas, and high porosity. They are manufactured by gelling a flowable sol-gel solution and then removing the liquid from the gel in a manner that does not destroy the pores of the gel.

Where a wet gel is dried at above the critical point of the liquid, there is no capillary pressure and therefore relatively little shrinkage as the liquid is removed. The product of such a process is very highly porous and is known as an aerogel, the term being used in the narrow sense. On the other hand, if the gel is dried by evaporation under sub-critical conditions, the resulting product is a xerogel. In the production of a xerogel, the material usually retains a very high porosity and a large surface area in combination with a very small pore size. In the wider sense of the word, aerogels also encompass dried gel products, which have been dried in a freeze-drying process. These products are generally called cryogels.

The term "aerogel" in its broader sense of "gel having air as the dispersion medium" encompasses each of aerogels in the narrower sense, xerogels and cryogels. As used herein, the term "aerogel" denotes aerogels in the broader sense of a gel having air as the dispersion medium.

Preferably, the aerogel used in the present invention has been dried under supercritical conditions, i.e., an aerogel "in the narrow sense" as described above.

The aerogel used in the present invention is in particulate form. In a preferred embodiment, the particles of aerogel will have an average diameter of from 0.2 to 5 mm. More preferably, the average diameter of the particles in the aerogel particulate material will be from 0.3 to 4 mm. and most preferably the average diameter of particles in the aerogel particulate material will be from 0.7 to 1.2 mm. These particle sizes are measured as weight averages and refer to the particle size of the starting material, rather than that present in the final composite.

During the method of the invention, in some embodiments, the average particle size of the aerogel can be reduced, as a result of the method steps used.

The aerogel particulate material can be any type of aerogel. In particular, the aerogel can be organic or inorganic. In view of their fire-resistant properties, inorganic aerogels are usually preferred. Organic aerogels include carbon aerogels and polymeric aerogels. Organic aerogels generally have a lower price and better insulation properties. Preferred inorganic aerogels are based on metal oxides. Particularly, preferred materials are silica, carbides and alumina. Silica aerogels, such as "Nanogel® Fine Particle Aerogel" from Cabot International are most preferred.

The aerogel particulate materials have a low density, typically from 0.01 g/cm$^3$ to 0.3 g/cm$^3$. The thermal conductivity of the aerogel particulate material is preferably from 5 to 20 mW/mK, more preferably from 7 to 16 mW/mK and most preferably from 9 to 12 mW/mK.

The precise quantity of mineral fibers used in the method and present in the composite of the invention is chosen so as to maintain appropriate strength and appropriate thermal insulation value, depending on the appropriate application, as a high quantity of fibers increases the strength of the composite, but decreases the thermal insulation value. This means that the lower limit of 24 wt % results in a composite having unusually good thermal insulation properties, and only adequate strength, which may be advantageous for some composites, where the strength is less important. If strength of the composite is particularly important the amount of fibers can be increased to the upper limit of 80 wt %, but this will result in only adequate thermal insulation properties. For a majority of applications, a suitable composition will include a fiber amount of from 30 to 70 wt % or from 40 to 70 wt %. Most usually, a suitable quantity of fibers will be from 50 to 60 wt %.

Similarly, the amount of aerogel particulate material used is chosen in order to provide both appropriate strength and thermal insulation value, as a high amount of aerogel particulate material decreases the strength of the composite, but increases the thermal insulation value. This means that the lower limit of 10 wt % aerogel particulate material results in a composite having excellent strength, but mediocre thermal insulation properties, which may be advantageous for some composites, where the strength is very important. If thermal insulation value of the composite is important, the amount of aerogel particulate material can be increased to the upper limit of 75 wt %, but this will result in mediocre strength. For a majority of applications, a suitable composition will include an aerogel particulate material amount of from 30 to 60 wt %, from 35 to 55 wt % or most typically from 40 to 50 wt %.

The amount of binder is also chosen on the basis of desired strength and cost, plus properties such as reaction to fire and thermal insulation value. The lower limit of 1 wt % results in a composite with a lower strength, which is however adequate for some applications, and has the benefit of relatively low cost and potential for good thermal insulation properties. In applications where a high mechanical strength is needed, a higher amount of binder should be used, such as up to the high limit of 30 wt %, but this will increase the cost of the resulting product and further the reaction to fire will often be less favorable, depending on the choice of binder.

It is believed that the binder does not connect to the aerogel particles. Instead, only the fibers are connected by the binder, and the aerogel particles are believed to be entrapped between the fibers in the composite after curing of the binder. Advantages of the indirect, mechanical retention of aerogel particles include that the mechanical properties of the resulting composite will not be compromised by the relatively brittle aerogel particles. Further, the insulation properties of the aerogel particles will not be compromised by the binder, which would be the case if binder connected to the surface of the aerogel particles. Furthermore, the small aerogel particles would consume a lot of binder due to the large surface area. The connection of fibers to other fibers by the binder, but not of fibers with aerogel is particularly prevalent in embodiments in which the aerogel particles are hydrophobic and highly non-polar, and in which the binder used is a polar binder such as novolac dry binder. In these embodiments especially, the binder will bind to the surfaces of the fibers, but will not bind to the surface of the aerogel particulate material.

A further advantage of the aerogel particles being entrapped between the fibers in the composite is that this makes it possible to glue together composite boards. Pure aerogel boards are very difficult to glue together because of the hydrophobic and highly non-polar nature of the aerogel. By having the aerogel particles entrapped in a fiber structure, it is possible to glue together composite boards, which is believed to be due to the glue bond to the fiber structure.

The mineral fibers (also known as man-made vitreous fibers or MMVF) used according to the present invention could be any mineral fibers, including glass fibers, ceramic fibers or stone fibers, but preferably, stone fibers are used. Stone wool fibers generally have a content of iron oxide at least 3% and alkaline earth metals (calcium oxide and magnesium oxide) from 10 to 40%, along with the other usual oxide constituents of mineral wool. These are silica; alumina; alkali metals (sodium oxide and potassium oxide) which are usually present in low amounts; and can also include titania and other minor oxides. Fiber diameter is often in the range 3 to 20 microns, in particular 5 to 10 microns, as conventional, In one embodiment, the mineral fibers include glass fibers preferably in an amount up to 20%, more preferably up to 15% and most preferably up to 10% of the total weight of starting materials. The remaining mineral fibers are preferably stone fibers. The glass fibers preferably have a length of from 10 mm to 50 mm, more preferably from 15 mm to 40 mm and most preferably from 20 mm to 30 mm. These glass fibers serve to reinforce the composite.

Preferably, the mineral fibers, and aerogel particulate material together form at least 60%, more preferably at least 65% and most preferably at least 70% of the total weight of starting materials.

Preferably, the mineral fibers, binder and aerogel particulate material make up at least 80%, more preferably at least 90% and most preferably substantially all of the total weight of starting materials.

In one embodiment, the fibers are provided in the form of a collected web and the method further comprises subjecting the collected web of fibers to a disentanglement process. The disentangled fibers are subsequently suspended in the primary air flow.

As used herein, the term "collected web" is intended to include any mineral fibers that have been collected together on a surface, i.e. they are no longer entrained in air, e.g., granulate, tufts or recycled web waste.

The collected web could be a primary web that has been formed by collection of fibers on a conveyor belt and provided as a starting material without having been cross-lapped or otherwise consolidated. Alternatively, the collected web could be a secondary web that has been formed by cross-lapping or otherwise consolidating a primary web. Preferably, the collected web is a primary web.

A feeding mechanism may be provided for feeding in a web. The feeding mechanism may comprise a set of driven feed rollers. For example, the web may be gripped between the feed rollers to be driven by the feed rollers for controlled advancing of the web to the disentanglement process.

In one embodiment, the disentanglement process comprises feeding the web of mineral fibers from a duct with a lower relative air flow to a duct with a higher relative air flow. In this embodiment, the disentanglement is believed to occur, because the fibers that enter the duct with the higher relative air flow first are dragged away from the subsequent fibers in the web. This type of disentanglement is particularly effective for producing open tufts of fibers, which can be penetrated by the aerogel particulate material.

Preferably, the speed of the higher relative air flow is from 20 m/s to 150 m/s or from 30 m/s to 120 m/s. More preferably, it is from 40 m/s to 80 m/s and most preferably from 50 m/s to 70 m/s. The higher relative air flow can be separate from the primary air flow, but more usually, it will feed into the primary air-flow. Preferably, the difference in speed between the lower relative air flow and the higher relative air flow is at least 20 m/s, more preferably at least 40 m/s and most preferably at least 50 m/s.

As used herein, the term "air flow" should be understood broadly so as to include not only a flow of air comprising gases in the proportions present in the atmosphere of Earth, but also a flow of any suitable gas or gases in any suitable proportions.

According to a particularly preferred embodiment, the disentanglement process comprises feeding the collected web to at least one roller which rotates about its longitudinal axis and has spikes protruding from its circumferential surface. In this embodiment, the rotating roller will usually also contribute at least in part to the higher relative air flow. Often, rotation of the roller is the sole source of the higher relative air flow.

In some embodiments, there are at least two rollers. These rollers may operate in tandem or sequentially.

The roller may be of any suitable size, but in a preferred embodiment, the roller has a diameter based on the outermost points of the spikes of from 20 cm to 80 cm or more preferably from 30 cm to 70 cm. Even more preferably, the diameter is from 40 cm to 60 cm and most preferably from 45 cm to 55 cm.

The roller may rotate at any suitable speed. For most embodiments, a suitable rate of rotation for the roller is from 500 rpm to 5000 rpm, preferably from 1000 rpm to 4000 rpm, more preferably from 1500 rpm to 3500 rpm, most preferably from 2000 rpm to 3000 rpm.

The dimensions and rate of rotation of the roller can be selected to provide a given speed at the circumference of the roller. In general, a high speed will result in a more effective disentanglement process, although this will depend on the type of web of mineral fibers used and the exact form of the roller. In most embodiments, it will be suitable for the outermost points of the spikes of the roller to move at a speed of from 20 m/s to 150 m/s, preferably from 30 m/s to 120 m/s, more preferably from 40 m/s to 80 m/s and most preferably from 50 m/s to 70 m/s.

The spikes may be permanently fixed to the roller for optimum resistance to wear and tear. For example, the spikes may be fixed by gluing or welding the spikes in blind holes arranged in the roller outer periphery. Alternatively, the spikes may be replaceable. This can, for example, be accomplished by the roller being a hollow cylinder with through holes in the cylindrical wall. The spikes can then, for example, have a head and be inserted through the holes from inside through the holes. Hereby, spikes can be replaced if they are broken or worn. Further, by having replaceable spikes, it is possible to change the pattern of the spikes. Hereby, it is possible to optimize the pattern for different types of material to be disentangled, e.g., loose mineral wool fibers, or a collected web of mineral wool fibers impregnated with a liquid binder.

The roller is preferably positioned within a substantially cylindrical chamber. The chamber will have an inlet duct through which the mineral fibers and optionally the aerogel particulate material and binder are fed to the roller. The chamber will also have an outlet through which the disentangled mineral fibers and optionally the aerogel particulate material and binder are expelled. Preferably, they are expelled in the primary air flow through the outlet.

In preferred embodiments, the mineral fibers and optionally, the binder and aerogel particulate material are fed to the roller from above. It is also preferred for the disentangled mineral fibers and optionally the binder and aerogel particulate material to be thrown away from the roller laterally from the lower part of its circumference. In the most preferred embodiment, the mineral fibers are carried approximately 180 degrees by the roller before being thrown off.

The roller preferably occupies the majority of the chamber. Preferably the tips of the spikes are less than 10 cm, more preferably less than 7 cm, and most preferably less than 4 cm from the curved wall of the substantially cylindrical chamber. This results in the air flow created by the roller being greater and a more thorough disentanglement of the fibers by the air flow and by the spikes themselves.

Preferably, the mineral fibers are fed to the roller from above.

The disentangled fibers are generally thrown off the roller in the primary air flow. In some embodiments, the roller will contribute to the primary air flow. In other embodiments, the roller will be the sole source of the primary air flow.

The aerogel particulate material can be carried to the primary air flow in any suitable manner.

In one embodiment, a disentanglement process is used and the aerogel particulate material is added to the collected mineral fiber web prior to the fiber disentanglement process and is suspended in the primary air flow together with the disentangled fibers. This method of addition of the aerogel particulate material generally promotes the most effective mixing of the components. In this embodiment, the aerogel particulate material can be pre-mixed with the collected mineral fiber web and optionally the binder in any suitable manner.

Alternatively, the aerogel particulate material can be carried to the primary air flow suspended in a tributary air flow. The tributary air flow is combined with the primary air flow, thereby mixing the aerogel particulate material with the fibers.

In some embodiments, it is not necessary to use a fiber disentanglement process. In one embodiment, the mineral fibers are provided as fibers entrained in air direct from a fiber-forming process. By this, it should be understood that the fibers, having been entrained in air in the formation process (e.g. having been thrown from a spinner) are not collected on a surface, but are transported as a suspension in air into the primary air flow.

In this embodiment, the aerogel particulate material may be supplied direct to the primary air flow, or carried to the primary air flow suspended in a tributary air flow. The tributary air flow is combined with the primary air flow, thereby mixing the aerogel particulate material with the fibers.

Where a tributary air flow carries suspended aerogel particulate material to the primary air flow, the speed of the tributary air flow is generally lower than that of the primary air flow. Typically, the tributary air flow has a speed of from 1 to 20 m/s, preferably from 1 to 13 m/s, more preferably from 2 to 9 m/s and most preferably from 3 to 7 m/s.

According to the invention, the fibers and the aerogel particulate material are suspended in a primary air flow. This allows the components to mix intimately. An advantage of mixing as a suspension in an air flow is that unwanted particles or agglomerations can be sifted out. Such particles are, e.g., pearls of the fibers and agglomerations are inter alia heavy chunks of wool, which have not been properly opened up to fibers, such as so-called chewing gum. In tests, mixing in an air flow performed surprisingly well, as it was expected that the very different physical and aerodynamic properties of the particles and the fibers would make this type of mixing impossible. It is remarkable that superior mixing takes place in spite of the difference in density and shape of the particles and fibers. The density of the aerogel particles is in the order of 140 $kg/m^3$, whereas for example mineral wool fibers have a density in the order of 2,500 $kg/m^3$. This might be expected to cause serious problems in the mixing process using an air flow, but surprisingly does not.

The primary air flow is generally not free from turbulence. In preferred embodiments, there is significant turbulence within the primary air flow as this promotes mixing of the aerogel particulate material with the mineral fibers. According to the present invention, the speed of the primary air flow at its source is preferably from 20 m/s to 150 m/s, more preferably from 30 m/s to 120 m/s, even more preferably from 40 m/s to 80 m/s and most preferably from 50 m/s to 70 m/s.

The primary air flow is preferably a generally lateral air flow. In embodiments where the aerogel particulate material is carried to the primary air flow suspended in a tributary air flow, the primary air flow is preferably generally lateral and the tributary air flow is generally upwards.

The primary air flow preferably enters a mixing chamber. In the mixing chamber, turbulence within the primary air flow allows more intimate mixing of the components.

In order to effect a thorough mixing of the fibers and particulate material, it is preferred to configure the apparatus such that the average dwell time of the aerogel particulate material and the fibers within the mixing chamber is at least 0.5 s, more preferably at least 2 s, or even at least 3 s.

However, due to the effectiveness of mixing the aerogel particulate material and the fibers suspended in a gas, it is usually not necessary for the average dwell time of the particulate material and the fibers within the mixing chamber to be greater than 10 s. More usually, the average dwell time is less than 7 s and most usually the average dwell time is less than 5 s.

The ambient temperature within the mixing chamber, when used, is usually from 20° C. to 100° C., more usually from 30° C. to 70° C. The temperature could be dependent on outside air temperature, i.e., cold in winter and hot in summer. Elevated temperatures of up to 100° C. could be used for providing a pre-curing of the binder in the mixing chamber.

In specific embodiments, the binder is a material that, under certain conditions, dries, hardens or becomes cured. For convenience, these and similar such processes are referred to herein as "curing". Preferably, these "curing" processes are irreversible and result in a cohesive composite material.

Inorganic, as well as, organic binders can be employed. Organic binders are preferred. Further, dry binders, as well as, wet binders can be used. Specific examples of binder materials include but are not limited to phenol formaldehyde binder, urea formaldehyde binder, phenol urea formaldehyde binder, melamine formaldehyde binder, condensation resins, acrylates and other latex compositions, epoxy polymers, sodium silicate, hot melts of polyurethane, polyethylene, polypropylene and polytetrafluoroethylene polymers etc.

In an embodiment, a dry binder is used. Any suitable dry binder could be used, but it is preferred to use a phenol formaldehyde binder, as this type of binder is easily available and has proved efficient. It may be an advantage to use a dry binder as in some events mixing may be easy, and further the need for maintenance of the equipment is low. Further, the binder is relatively stable and storable.

According to an alternative embodiment, a wet binder is used. Wet binders have the advantage of low cost compared to dry binders, and it is often possible to reduce the amount of binder using wet binder compared to dry binders. A reduction in the amount of binder further results in a better reaction of the composite to fire. Any suitable wet binder could be used, but it is preferred to use a phenol formaldehyde binder, as this type of binder is easily available and has proved efficient.

The binder may be mixed with the mineral fibers and/or aerogel particulate material before, during or after mixing of the mineral fibers with the aerogel particulate material. In some embodiments, especially where the binder is wet, it is preferred to mix the binder with the fibers prior to the mixing of the fibers with the aerogel particulate material. In particular, the fibers can be in the form of an uncured collected web containing wet binder.

Alternatively, wet binder could be sprayed onto fibers entrained in air as they are carried to the primary air flow direct from a fiber-forming process.

When dry binder is used, this could, for example, be premixed with a collected web of mineral fibers and optionally aerogel particulate material. Alternatively, it could be supplied to the primary air flow separately and mixed in the primary air flow.

The mineral fibers, binder and aerogel particulate material, when suspended in the primary air flow, are in some embodiments, subjected to a further air flow in a different direction to the primary air flow. This helps to generate further turbulence in the primary air flow, which assists mixing further. Usually the primary air flow is generally lateral and the further air flow is generally upwards. In some embodiments, a plurality of further air flows is provided.

Preferably, the further air flow has a speed of from 1 to 20 m/s, more preferably from 1 to 13 m/s, even more preferably from 2 to 9 m/s and most preferably from 3 to 7 m/s.

The mixture of mineral fibers, aerogel particulate material and binder is collected from the primary air flow by any suitable means. In one embodiment, the primary air flow is directed into the top of a cyclone chamber, which is open at its lower end and the mixture is collected from the lower end of the cyclone chamber.

In an alternative embodiment, the primary air flow is directed through a foraminous surface, which catches the mixture as the air flow passes through.

In embodiments where there is a disentanglement process before the fibers are suspended in the primary air flow, the mixture of mineral fibers, aerogel particulate material and binder is preferably subjected to a further fiber disentanglement process after the mixture has been suspended in the primary air flow, but before the mixture is pressed and cured.

The further disentanglement process may have any of the preferred features of the disentanglement process described previously.

In a particularly preferred method, the mixture of mineral fibers, binder and aerogel particulate material is removed from the primary air flow, preferably in a cyclone chamber, and fed to a rotating roller having spikes protruding from its circumferential surface. The roller of the further disentanglement means may have any of the features described above in relation to the roller to which the collected web can be fed initially.

The mixture of mineral fibers, aerogel particulate material and binder is preferably thrown from the further disentanglement process into a forming chamber.

Raving undergone the further disentanglement process, the mixture of mineral fibers, aerogel particulate material and binder is collected, pressed and cured. Preferably, the mixture is collected on a foraminous conveyor belt having suction means positioned below it.

In a preferred method, according to the invention, the mixture of aerogel particulate material, binder and mineral fibers, having been collected, is scalped before being cured and pressed.

The method may be performed as a batch process, however according to an embodiment, the method is performed at a mineral wool production line feeding a primary or secondary mineral wool web into the fiber separating process, which provides a particularly cost efficient and versatile method to provide composites having favorable mechanical properties and thermal insulation properties in a wide range of densities.

According to a special embodiment, the method is performed as an on-line process in a mineral wool production line.

Once the mixture of mineral fibers, aerogel particulate material and binder has been collected, it is pressed and cured to produce a composite of the desired density.

Pressure, temperature and holding time for the curing and pressing is dependent inter alia on the type of binder used. Examples of temperatures and holding times used in preliminary tests are mentioned below.

An aspect of the invention relates to an aerogel-containing composite obtainable by the method of the invention.

A further aspect of the invention relates to an aerogel-containing composite comprising fibers in an amount of from 24 to 80 wt % of the total weight of starting materials, aerogel particulate material in an amount of from 10 to 75 wt % of the total weight of starting materials, binder in an amount of from 1 to 30 wt % of the total weight of starting materials, wherein the composite is substantially homogeneous and is cured and pressed to a density between 120 kg/m$^3$ and 800 kg/m$^3$, such as between 150 kg/m$^3$ and 800 kg/m$^3$.

By the wording "substantially homogeneous", it should be understood that the composite is homogeneous at a millimeter scale, i.e., a microscope image of a given area on a millimeter scale is (substantially) identical to other samples of the mixture. It further means that after mixing, the materials are distributed substantially evenly within the composite, i.e., that the aerogel particulates are present in substantially the same amount in the whole composite.

Preferably, the millimeter scale area is 1 mm$^2$. However, if the composite contains discrete particles in the order of 100 μm and above, "substantially homogeneous" can be defined in relation to the largest discrete ingredient. Hence, it should be understood that the composite is visually homogeneous at a scale related to the largest discrete ingredient, e.g., 10 times the size of the largest particulate. For a particle size of say 1 mm (largest dimension) a visual investigation of an area of, e.g., 100 mm$^2$ is (substantially) identical to other samples of the mixture. It further means that after mixing, the materials are distributed substantially evenly within the composite, i.e., that the aerogel particulates are present in substantially the same amount in the whole composite with no visual accumulations.

Any of the preferred features of the final product described in relation to the method apply equally to the composite of the invention where relevant.

The invention also relates to novel apparatuses suitable for carrying out the method of the invention.

A first novel apparatus comprises:
a mineral fiber-forming apparatus for producing a supply of fibers entrained in air,
binder supply apparatus for supplying binder to the fibers,
a first collector arranged to receive the fibers from the fiber-forming apparatus, suction apparatus for applying suction through the collector and thereby collecting the fibers on the collector as a web, a disentanglement apparatus for disentangling the web to provide disentangled fibers, web supply apparatus for supplying the web to the disentanglement apparatus, aerogel particulate material supply apparatus positioned before or after the disentanglement apparatus, air supply apparatus for supplying a primary air flow in which to suspend disentangled mineral fibers, a second collector for collecting the disentangled mineral fibers, binder and aerogel particulate material, a press for pressing the collected mineral fibers, binder and aerogel particulate material.

The mineral fiber-forming apparatus can be any apparatus suitable for that purpose, for example, a cascade spinner or a spinning cup. In preferred embodiments of the apparatus, the mineral fiber-forming apparatus is a cascade spinner. In each case, a mineral melt is supplied and fibers are produced by the effect of centrifugal action of the apparatus.

The binder supply means supplies binder to the mineral fibers. It can be positioned at any point before the second collector, but is preferably positioned between the fiber-forming apparatus and the first collector. In another embodiment, the binder supply means is positioned between the first collector and the second collector. In another preferred embodiment, the binder supply means is positioned between the first collector and the disentanglement means.

The binder supply means could be adapted to supply wet binder or to supply dry binder.

The first collector is preferably in the form of a continuously operated first conveyor belt. The belt is pervious to air. The fibers form a primary web on the belt. Suction means are positioned behind the first collector to allow an air flow through the collector.

The first apparatus may optionally comprise means for treating the primary web in any manner known to the person skilled in the art. For example, the apparatus can comprise a pendulum belt for cross-lapping the primary web onto a further continuously operated conveyor belt, to form a secondary mineral fiber web.

In a preferred embodiment, the first collector is in the form of a conveyor belt leading to an inlet duct. The inlet may have conveying rollers at its upper edge to assist with the movement of the mineral fibers through the inlet duct.

Between the first collector and the disentanglement apparatus, in some embodiments, there is a substantially vertical duct. Often the substantially vertical duct will be narrower at its lower end than at its upper end.

The first apparatus comprises disentanglement means for disentangling the primary or secondary web to form disentangled fibers. In one embodiment, the disentanglement apparatus has a first duct for carrying the primary or secondary web and a second duct adjoined to the first duct. In this embodiment, the disentanglement apparatus comprises means for supplying an air flow in the second duct with a higher speed than is present in the first duct.

In particular, the disentanglement means can be in the form of a roller as described in relation to the method of the invention. Any of the preferred or optional features of the roller described in relation to the method are equally applicable to the first novel apparatus of the invention.

Furthermore, the first apparatus can comprise a cylindrical chamber that houses the roller. Any of the features of the cylindrical chamber that are described in relation to the method of the invention are equally applicable in relation to the first apparatus of the invention.

The first apparatus of the invention also requires air supply means for supplying the primary air flow. This air supply means can be formed as part of the disentanglement apparatus. For example, the means for supplying an air flow in the second duct with a higher speed than is present in the first duct could also be the supply of the primary air flow.

It is also possible for the roller to act as the means for generating the primary air flow itself as it creates a flow of disentangled mineral fibers suspended in an air flow.

A second novel apparatus comprises:

a mineral fiber-forming apparatus for producing a supply of fibers suspended in a primary air flow, air supply apparatus for supplying the primary air flow, binder supply apparatus for supplying binder to the fibers, aerogel particulate material supply apparatus for supplying aerogel particulate material to the primary air flow, a collector for collecting the mineral fibers, binder and aerogel particulate material, a press for pressing the collected mineral fibers, binder and aerogel particulate material.

The mineral fiber-forming apparatus of the second apparatus of the invention can also be any apparatus suitable for that purpose, for example, a cascade spinner or a spinning cup. In preferred embodiments of the apparatus, the mineral fiber-forming apparatus is a cascade spinner.

In the second apparatus of the invention, air supply means are required for supplying the primary air flow. This can be in the form of a supply of cooling gas directed axially to the rotating wheels of a cascade spinner, in which fibers are carried from the spinner having been thrown off the wheel.

Binder supply means are positioned to supply binder, usually in the form of a spray to the fibers suspended in an air flow.

In both apparatuses of the invention, aerogel particulate material supply means are required. The aerogel particulate material supply means may comprise a hopper containing aerogel particulate material. Dosed supply of aerogel particulate material may be obtained by a screw feeder, weighing cell or any suitable means for precise dosing of particulate material.

In the first apparatus, although the aerogel particulate material must eventually be supplied to the primary air flow, it is not necessary that it is supplied from the supply means direct to the air flow. In fact, it is preferred to position the aerogel particulate material supply means to supply aerogel particulate material to the web of mineral fibers and feed these together to the disentanglement apparatus. Where it is positioned before the disentanglement means, the aerogel particulate material is supplied to the primary air flow together with the disentangled fibers.

However, the aerogel particulate material could also be positioned after the disentanglement means.

In the second apparatus and optionally in the first apparatus, the aerogel particulate material supply means is positioned to supply aerogel particulate material to the primary air flow. Optionally, a tributary air flow supply means can be positioned to supply a tributary air flow for carrying the aerogel particulate material to the primary air flow.

In both apparatuses, a further air flow supply means may be present for supplying a further air flow to the primary air flow.

Each of the apparatuses of the invention preferably comprises a mixing chamber as described in relation to the method of the invention. The tributary and/or further air flow supply means, when present, are preferably positioned at the lower end of the mixing chamber and configured to supply an upwards flow of air within the mixing chamber. The primary air flow supply means is preferably positioned at the side of the mixing chamber and is configured to supply an air flow laterally across the chamber.

When present, the further air flow supply means may have a gauze disposed across its opening to prevent the entry of solid materials.

At the lower end of the mixing chamber, there is preferably a discharge opening into which heavy pellets or compacted fibers fall.

In preferred embodiments, the mineral fibers, aerogel particulate material and binder enter the mixing chamber together at one side suspended in the primary air flow. The mixture is then blown upwards and further mixed by a further air supply means positioned at the lower end of the chamber. The mixture then leaves the mixing chamber via a removal duct at the upper end of the mixing chamber.

The removal duct leads eventually to a collector. In the first apparatus of the invention, this is the second collector. The collector may be in the form of a foraminous belt, behind which suction means are positioned.

Alternatively, the collection means could comprise a cyclone chamber capable of separating the mixture of mineral fibers, binder and aerogel particulate material from the primary air flow. In this embodiment, the cyclone chamber has an opening at its lower end, through which the mixture is ejected, whilst the air flow is removed through a duct at the upper end. The cyclone chamber has a greater diameter at its upper end than at its lower end.

In one embodiment the mixture is ejected from the cyclone chamber onto a conveyor belt.

In the first apparatus of the invention, there is preferably a further disentanglement apparatus positioned to receive the mixture of mineral fibers, aerogel particulate material and binder. The further disentanglement apparatus may have any of the preferred features described in relation to the disentanglement apparatus for disentangling the collected web of mineral fibers.

Preferably, the further disentanglement apparatus is positioned to receive the mixture of mineral fibers, aerogel particulate material and binder from the opening at the lower end of the cyclone chamber.

Preferably, there is a forming chamber positioned to receive fibers from the further disentanglement apparatus. Preferably, the forming chamber comprises a foraminous conveyor belt for collecting the mixture of mineral fibers, aerogel particulate material.

In each of the apparatuses of the invention, it is preferred to provide scalping means prior to the press. The apparatus can be configured to recycle the scalped material.

Each of the apparatuses according to the present invention comprises a press for pressing and curing the collected mixture of mineral fibers, binder and aerogel particulate material. The press is suitable for pressing the composite to a density of from 120 kg/m$^3$ to 800 kg/m$^3$, in particular from 150 kg/m$^3$ to 800 kg/m$^3$. Generally, the press is adapted to heat the composite in order to cure the binder.

Any of the preferred features described in relation to the method of the invention apply equally in relation to the apparatus. Similarly, any of the apparatus features disclosed above apply equally in relation to the method of the invention.

BRIEF DESCRIPTION OF THE DRAWINGS

The invention will be described in the following by way of example and with reference to the drawings in which.

DETAILED DESCRIPTION OF THE INVENTION

Figure 1:
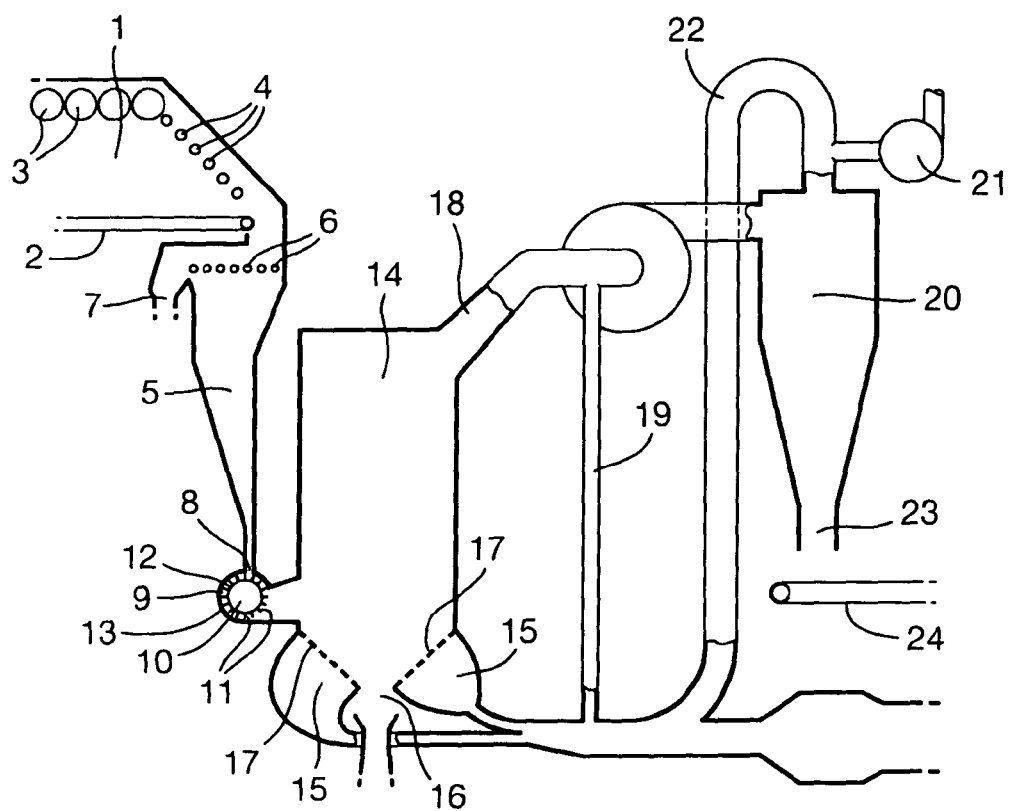
FIG. 1 is a schematic drawing of an apparatus for fiber separating and mixing raw materials.

Apparatus suitable for use in the method of the present invention can be seen in FIG. 1. Where a fiber-forming apparatus and collector are configured to carry a mineral fiber web to the inlet duct 1, a binder supply means is positioned to supply binder to the mineral fibers and an aerogel particulate supply means is positioned to supply aerogel particulate material to the inlet duct, the apparatus shown could also form part of the first novel apparatus of the invention.

The apparatus comprises an inlet duct 1 for starting materials, e.g., aerogel particles, binder and mineral fibers and for specific raw materials the apparatus may comprise a shredder (not shown) at the inlet duct 1 to at least partly cut up bulky material. At the lower edge of the inlet duct, there is a conveyor 2 that carries the raw materials through the inlet duct 1. At the upper edge of the inlet duct, conveying rollers 3 assist with feeding the starting materials through the inlet duct 1. At the end of the inlet duct 1, a first set of mutually spaced elongate elements 4 extend across the end of the inlet duct 1. These serve to break up larger pieces of the starting materials, for example the mineral fiber web. In some embodiments, the elongate elements 4 are in the form of rotating brushes that draw the starting materials between them as they rotate.

The starting materials that pass through the end of the inlet then fall downwards into a substantially vertical duct 5. In the embodiment shown, a second set of mutually spaced elongate elements 6 extend across the upper end of the duct. The second set of elongate element is usually more closely spaced than the first. In the embodiment shown, the second set of elongate elements rotate so as to allow sufficiently small pieces of the mineral fiber web to pass through, but carry larger pieces away via a starting material recycling duct 7.

The vertical duct 5 generally becomes narrower at its lower end. In the embodiment shown, the lower end of the vertical duct forms the inlet 8 to the substantially cylindrical chamber 9. As shown, the inlet 8 is at an upper part of the substantially cylindrical chamber 9. In use, starting materials pass through the vertical duct 5 and through the inlet 8 into the cylindrical chamber 9.

The cylindrical chamber 9 houses a roller 10 having spikes 11 protruding from its circumferential surface 12. The roller 10 shown in FIG. 1 rotates anticlockwise as shown in the drawing, so that starting materials are carried from the inlet (8) around the left side of the roller 10 as shown and thrown out laterally in a primary air flow into a mixing chamber 14. The cylindrical chamber 9 and the roller 10 together form the disentanglement means. The disentanglement means cause disentanglement of the fibers, meaning that the fibers, which may be provided as wool entangled as a web or as tufts, will be worked on to provide more open wool or even loose fibers, thereby facilitating subsequent mixing of the fibers with other components.

In the embodiment shown, the primary air flow is created by the rotation of the roller 10 within the cylindrical chamber 9, and in particular by the movement of the spikes 11 and starting material through the space between the circumferential surface of the roller and the curved wall 13 of the cylindrical chamber 9.

The mixing chamber 14 shown in FIG. 1 comprises a discharge opening 16 and further air flow supply means 15. The further air flow supply means 15 comprise openings through which the further air flow is supplied. Gauzes 17 are disposed across the openings of the further air flow supply means 15. These gauzes allow the further air flow to pass through into the mixing chamber 14, but are intended to prevent the entry of materials into the supply means. The further air flow supply means 15 direct the further air flow upwards into the mixing chamber 14.

The further air flow meets the primary air flow containing the disentangled fibers in the mixing chamber. The further air flow has the effect of carrying the mixture of disentangled fibers, binder and aerogel particulate material upwards within the mixing chamber 14. Some more compacted fibers and pearls of mineral material will not be carried upwards in the mixing chamber, but fall to the lower end and through the discharge opening 16.

The desired mixture of disentangled fibers, aerogel particulate material and binder is carried to the upper part of the mixing chamber 14 where a removal duct 18 is positioned to carry the mixture from the mixing chamber 14. A first air recycling duct 19 is adjoined to the removal duct 18 and recycles some of the air from the removal duct 18 back to the further air supply means 15.

The removal duct leads to a cyclone chamber 20. The cyclone chamber 20 has a second air recycling duct 22 leading from its upper end to the further air supply means 15. A filter 21 is adjoined to the second air recycling duct. In use, the filter 21 removes any stray mineral fibers, aerogel particulate material and binder from the second air recycling duct 22. As air is removed from the upper end of the cyclone chamber 20, the mixture of disentangled fibers, aerogel particulate material and binder falls through a cyclone chamber outlet 23 at the lower end of the cyclone chamber 20.

A collector 24 is positioned below the cyclone chamber outlet 23. In the embodiment shown, the collector 24 is in the form of a conveyor, which carries the collected fibers to a pressing and curing apparatus (not shown).

Figure 2:
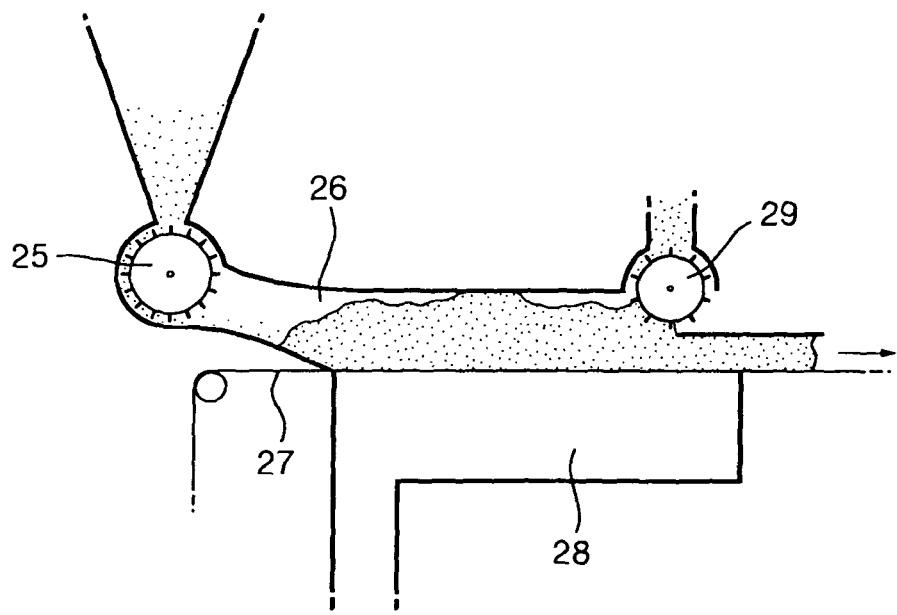
FIG. 2 is a schematic drawing of a further disentanglement apparatus as described above.

FIG. 2 shows an embodiment of the further disentanglement apparatus, which may optionally be used in the method. The further disentanglement apparatus can be positioned in place of collector 24 as shown in FIG. 1. The further disentanglement apparatus shown comprises roller 25, which is the same as roller 10 in structure. The mixture of components is fed to roller 25 from above and thrown out into forming chamber 26. At its lower end, the forming chamber 26 comprises a foraminous conveyor belt 27, below which suction means 28 are positioned. Scalper 29 is positioned to scalp the top of the mixture to provide an even surface. The scalped material can then be recycled.

Foraminous conveyor belt 27 carries the mixture to a press (not shown).

Figure 3:
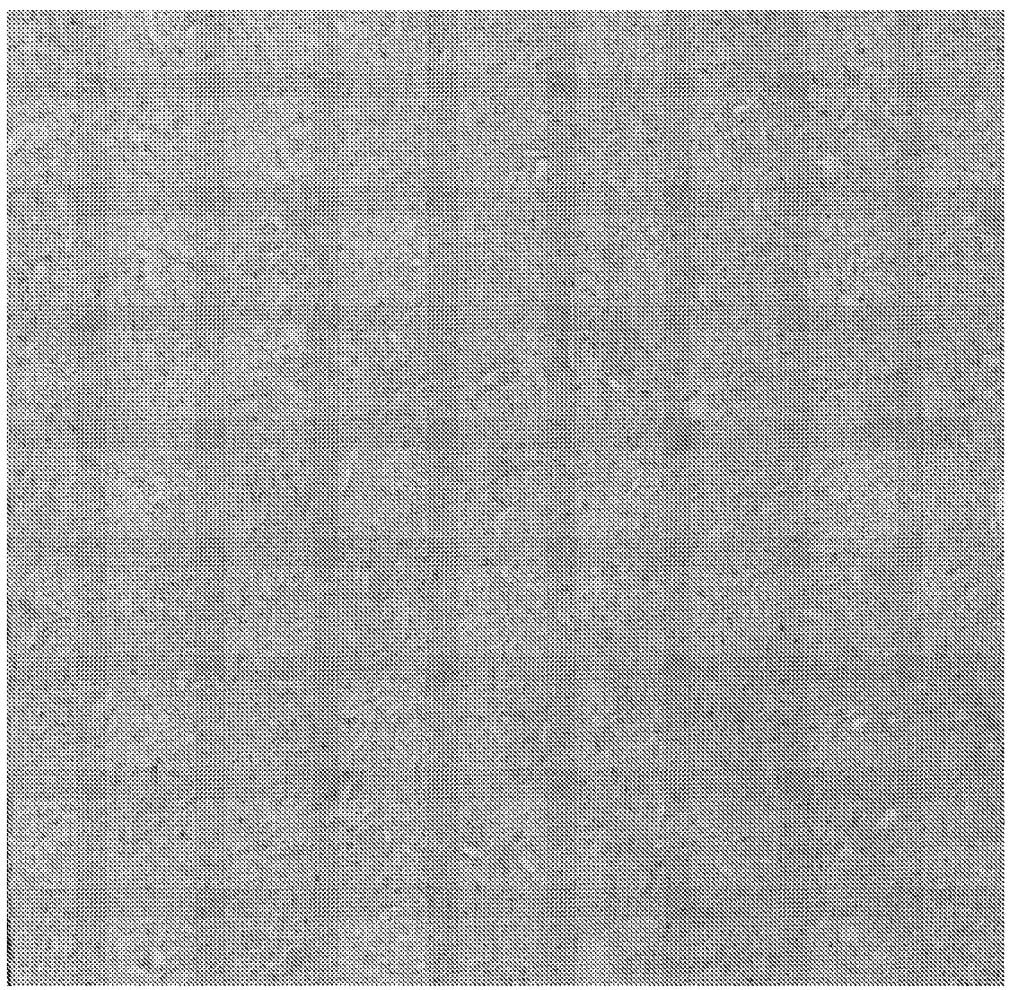
FIG. 3 is a photo of a composite panel according to the invention made in a pilot run.

The photo in FIG. 3 depicts a composite panel produced in a pilot run on a full-scale apparatus according to the invention. The composite raw materials fed into the apparatus were uncured stone wool web with wet binder and aerogel particulates. The sample shown is approximately 20 cm×20 cm. The composite panel is seen to be very homogeneous. It is not possible to see the aerogel particles with the naked eye. The stone wool web was disintegrated and opened up in the apparatus, and there are only small fiber tufts visible on the surface, and there is a random pattern of the small fiber tufts, so there is no indication of accumulation or variation in distribution.

Figure 4:
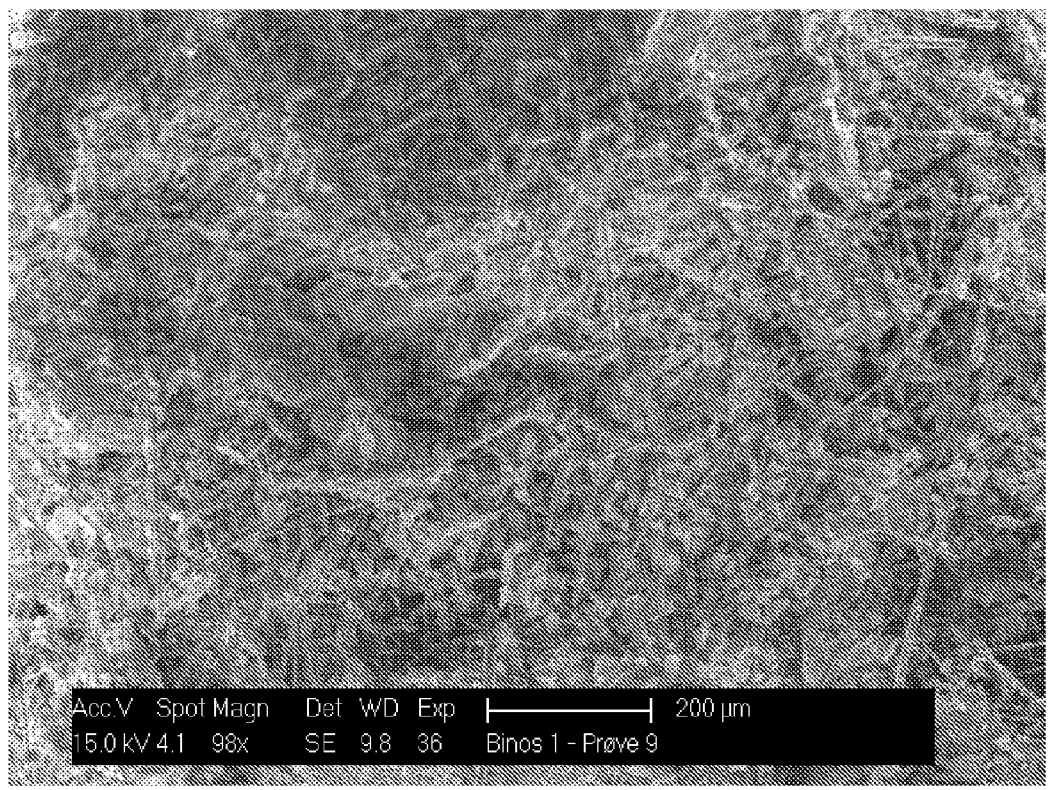
FIG. 4 is a microscope photo of a sample of an aerogel-containing composite according to the invention.

The microscope photo of FIG. 4 shows a sample of an aerogel-containing composite made according to the invention using loose stone wool fibers. The aerogel particulate material can be seen as small dots or grains. The fibers are also visible. As can be seen, the aerogel particulate material and fibers are substantially homogeneously mixed on a 1 mm scale.

Figure 5:
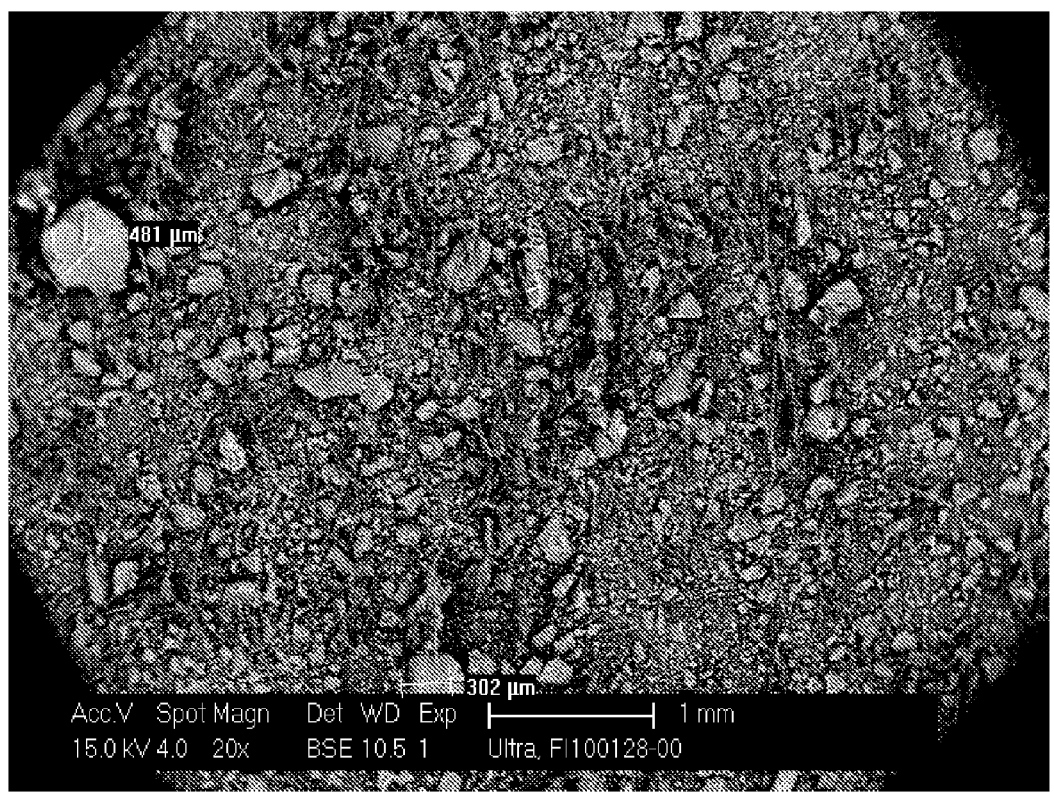
FIG. 5 is a microscope photo of a sample of an aerogel-containing composite according to the invention.

The microscope photograph of FIG. 5 shows the mixture of aerogel particles and fibers in the panel according to the invention. The two largest particles are measured to 481 µm and 302 µm. The composition of the analyzed panel was approximately 51 wt % aerogel particles, 38 wt % mineral wool fibers and 11 wt % binder.

Figure 6:
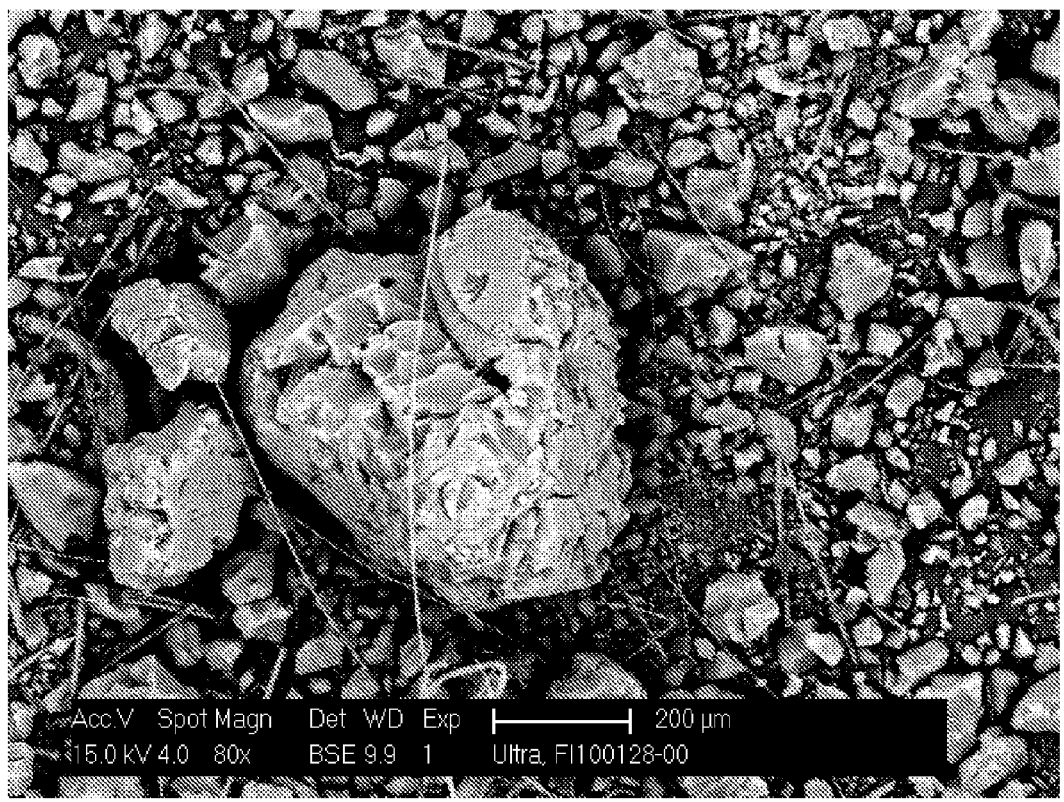
FIG. 6 is a microscope photo of a sample of an aerogel-containing composite according to the invention.

Similarly, the microscope photograph of FIG. 6 shows the mixture of aerogel particles and fibers in the panel according to the invention in larger magnification. There is no sign that the binder attaches to the aerogel particles. This is considered highly beneficial as mentioned above.

In the testing, a dry phenol formaldehyde polymer binder (powder) was used of the type sold by Dynea under the trade name "Prefere 94 8182U7". Binder content in the test was 12%-wt to be sure that the boards produced had sufficient strength. Curing time in initial tests started at 7 minutes, and was subsequently raised to 14 minutes to be sure of proper curing.

Figure 7:
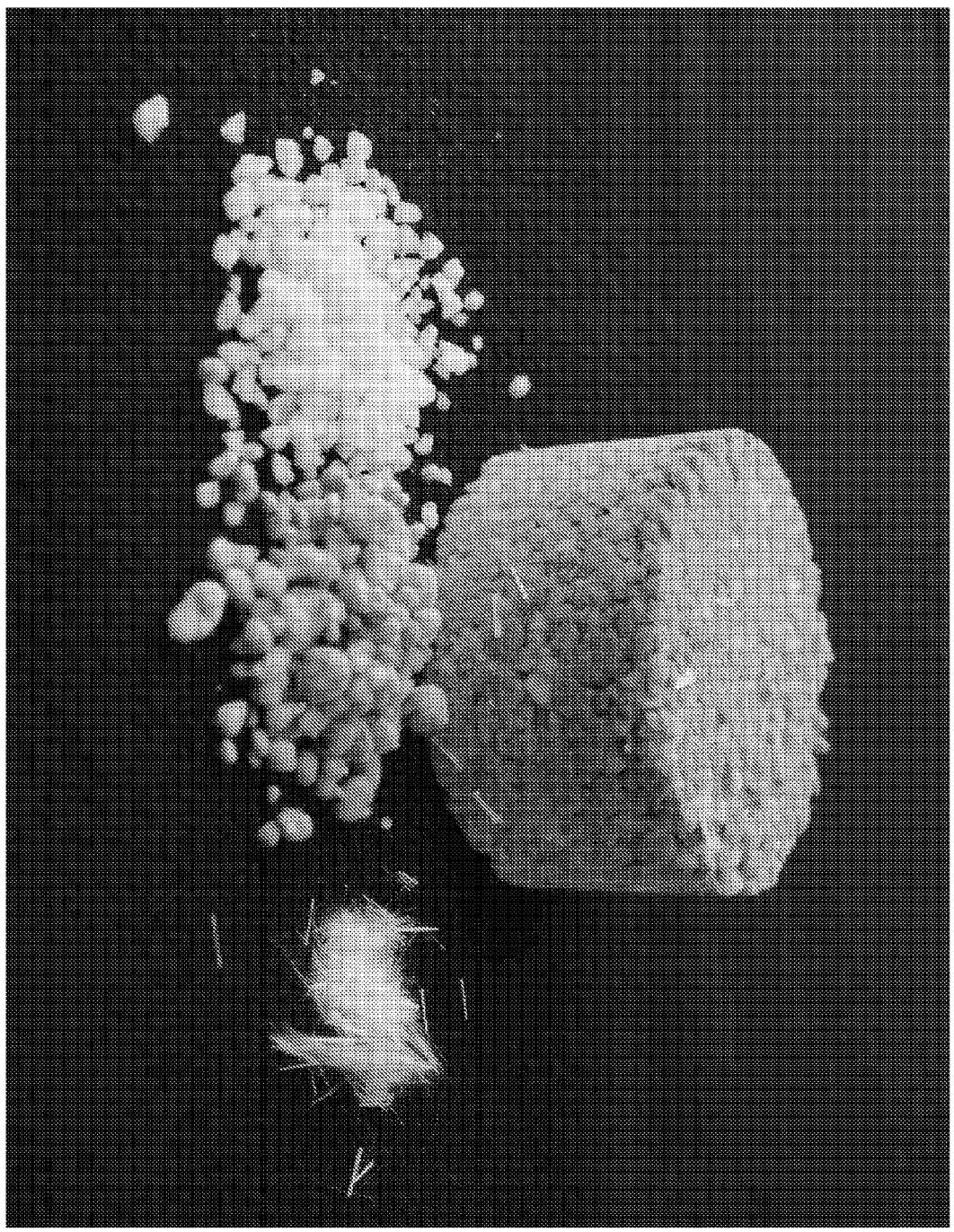
FIG. 7 is a photograph of a composite manufactured using a mixing method other than that according to the invention.
Figure 8:
FIG. 8 is a photograph of further composites manufactured using a mixing method other than that according to the invention.

FIGS. 7 and 8 are comparative examples showing composites not produced according to the invention.

FIG. 7 is a photograph showing the result achieved when the components of the composite are mixed by a method not according to the present invention. In this case, the components were mixed with a blender. It is clear from FIG. 7 that the composite is not homogeneous, because compact balls of fibers and separated regions of aerogel, fibers and binder are visible with the naked eye. This is in contrast to the smooth and homogeneous appearance of composites manufactured according to the invention, in particular as shown in FIG. 3.

Similarly, FIG. 8 is a photograph of a number of composites comprising 10-31% aerogel particulate material, mineral fibers and approximately 10% dry binder. The components of the composite were mixed in a blender using a method not according to the invention. Again, compacted balls of fibers and distinct regions of the different components can be seen in the composites, which is in contrast to the homogeneous appearance of composites manufactured according to the invention, in particular as shown in FIG. 3.

In tests, aerogel particulate material of the type "Nanogel® Fine Particle Aerogel" from Cabot International was used and showed excellent results.

The tests were carried out with stone wool fibers having a density of approximately 2,800 kg/m$^3$.

The requirement for the composite of being substantially homogeneous is, in this case, considered fulfilled with a maximum variation of 5% (e.g. density) in an X-Y plane co-planar with the major surfaces of the composite panel. A higher variation is accepted in the Z-plane, i.e., the thickness of the composite panel.

The invention claimed is:

1. A method for manufacturing an aerogel-containing composite, said method comprising the steps of:

providing mineral fibers in an amount of from 24 to 80 wt % of the total weight of starting materials, wherein the mineral fibers are provided in the form of a collected web and the collected web of fibers are further subjected to a disentanglement process, providing an aerogel particulate material in an amount of from 10 to 75 wt % of the total weight of starting materials, providing a binder in an amount of from 1 to 30 wt % of the total weight of starting materials, suspending the mineral fibers in a primary air flow and suspending the aerogel particulate material in the primary air flow, thereby mixing the suspended aerogel particulate material with the suspended mineral fibers, and mixing the binder with the mineral fibers and/or aerogel particulate material before, during or after mixing of the mineral fibers with the aerogel particulate material, collecting the mixture of mineral fibers, aerogel particulate material and binder and pressing and curing the mixture to provide a consolidated composite with a density of from 120 kg/m$^3$ to 800 kg/m$^3$;

wherein the mineral fibers, binder and aerogel particulate material, when suspended in the primary air flow, are subjected to a further air flow in a different direction to the primary air flow;

wherein the primary air flow is generally lateral and the further air flow is generally upwards.

2. A method according to claim 1, wherein the disentanglement process comprises feeding the web from a duct with a lower relative air flow to a duct with a higher relative air flow.

3. A method according to claim 2, wherein the speed of the higher relative air flow is from 20 m/s to 150 m/s.

4. A method according to claim 1, wherein the disentanglement process comprises feeding the collected web to at least one roller which rotates about its longitudinal axis and has spikes protruding from its circumferential surface.

5. A method according to claim 4, wherein the roller has a diameter based on the outermost points of the spikes of from 20 cm to 80 cm.

6. A method according to claim 4, wherein the roller rotates at a rate of from 500 rpm to 5000 rpm.

7. A method according to claim 4, wherein the outermost points of the spikes of the roller move at a speed of from 20 m/s to 150 m/s.

8. A method according to claim 1, wherein the aerogel particulate material is added to the collected mineral fiber web prior to the fiber disentanglement process and is suspended in the primary air flow together with the disentangled fibers.

9. A method according to claim 1, wherein the mineral fibers are in the form of an uncured web containing wet binder.

10. A method according to claim 1, wherein the method is performed at a mineral wool production line, which feeds a primary or secondary mineral wool web into the fiber disentanglement process.

11. A method according to claim 1, wherein the mixture of mineral fibers, aerogel particulate material and binder is subjected to a further fiber disentanglement process after the mixture has been suspended in the primary air flow, but before the mixture is pressed and cured.

12. A method according to claim 1, wherein the mineral fibers are provided as fibers entrained in air direct from a fiber-forming process.

13. A method according to claim 1, wherein at least part of the aerogel particulate material is carried to the primary air flow as aerogel particulate material suspended in a tributary air flow and the method comprises combining the tributary air flow with the primary air flow and thereby mixing the aerogel particulate material with the mineral fibers.

14. A method according to claim 1, wherein the mineral fibers, binder and aerogel particulate material, when suspended in the primary air flow, are subjected to a further air flow in a different direction to the primary air flow.

15. A method according to claim 14, wherein the primary air flow is generally lateral and the further air flow is generally upwards.

16. A method according to claim 1, wherein the primary air flow has an initial speed of from 20 m/s to 150 m/s.

17. A method according to claim 14, wherein the further air flow has a speed of from 1 to 20 m/s.

18. A method according to claim 1, wherein the binder is provided in dry form.

19. A method according to claim 1, wherein the binder is provided in wet form.

* * * * *